United States Patent
Sawada et al.

(10) Patent No.: US 9,114,485 B2
(45) Date of Patent: Aug. 25, 2015

(54) TI-BASED BRAZING FILLER METAL AND METHOD FOR PRODUCING THE SAME

(75) Inventors: Toshiyuki Sawada, Himeji (JP); Hiroyuki Hasegawa, Himeji (JP)

(73) Assignee: Sanyo Special Steel Co., Ltd., Himeji-shi (JP)

( * ) Notice: Subject to any disclaimer, the term of this patent is extended or adjusted under 35 U.S.C. 154(b) by 729 days.

(21) Appl. No.: 12/842,406

(22) Filed: Jul. 23, 2010

(65) Prior Publication Data

US 2011/0048582 A1    Mar. 3, 2011

(30) Foreign Application Priority Data

Jul. 24, 2009  (JP) .................. 2009-173617
Jun. 14, 2010  (JP) .................. 2010-135182

(51) Int. Cl.

| | |
|---|---|
| B23K 35/24 | (2006.01) |
| B23K 35/32 | (2006.01) |
| B22F 1/00 | (2006.01) |
| B23K 35/02 | (2006.01) |
| B23K 35/30 | (2006.01) |
| C22C 1/04 | (2006.01) |
| C22C 19/03 | (2006.01) |

(52) U.S. Cl.
CPC ............. *B23K 35/325* (2013.01); *B22F 1/0003* (2013.01); *B23K 35/0227* (2013.01); *B23K 35/0244* (2013.01); *B23K 35/24* (2013.01); *B23K 35/30* (2013.01); *C22C 1/0425* (2013.01); *C22C 1/0433* (2013.01); *C22C 1/0458* (2013.01); *C22C 19/03* (2013.01); *B22F 2998/00* (2013.01)

(58) Field of Classification Search
None
See application file for complete search history.

(56) References Cited

U.S. PATENT DOCUMENTS 3,117,003 A * 1/1964 Chen .............................. 148/430
2002/0190105 A1* 12/2002 Kanada et al. ............. 228/122.1

FOREIGN PATENT DOCUMENTS

| JP | 59126739 A | 7/1984 |
| JP | 59220299 A | 12/1984 |
| JP | 4220193 A | 8/1992 |
| JP | 200990304 A | 4/2009 |

OTHER PUBLICATIONS

Klotz et al, Experimental Investigation of the Cu—Ti—Zr System at 800°C, 1666-1671 Intermetallics 15 (2007).*
Okochi et al., "Production of Ti Alloy Powder with Low Oxygen Content by Levitation Melting and Gas Atomization", Aug. 12, 2003, pp. 227-232.

* cited by examiner

*Primary Examiner* — Yoshitoshi Takeuchi
(74) *Attorney, Agent, or Firm* — The Webb Law Firm

(57) ABSTRACT

A Ti-based brazing filler material comprising in mixture a Zr-containing alloy powder comprising 30 to 90% by mass of one or two of Cu and Ni, the balance being Zr and unavoidable impurities and a Ti-based powder comprising 0 to 50% by mass of one or two of Cu and Ni, the balance being Ti and unavoidable impurities, wherein the weight ratio of the Zr-containing alloy powder to the Ti-based powder is 8:2 to 4:6. This Ti-based brazing filler material can achieve good brazing and can exhibit excellent effects in the production of aerospace instruments, medical instruments, frames of glasses, heat-exchangers made from titanium.

11 Claims, No Drawings

TI-BASED BRAZING FILLER METAL AND METHOD FOR PRODUCING THE SAME

CROSS-REFERENCES TO RELATED APPLICATIONS

The present application claims priorities to Japanese Patent Application No. 2009-173617 filed on Jul. 24, 2009 and Japanese Patent Application No. 2010-135182 filed on Jun. 14, 2010, the entire disclosures of which are incorporated herein by reference.

BACKGROUND OF THE INVENTION

1. Field of the Invention

The present invention relates to a Ti-based brazing filler material, which is mainly used for brazing and soldering Ti or Ti-based alloy, and method for producing the Ti-based brazing filler material.

2. Description of Related Art

Titanium has features such as high specific strength (i.e., strength with regard to specific weight), high corrosion resistance, and high biocompatibility, and Ti alloys such as Ti-6Al-4V alloy have been used for various aerospace instruments, medical instruments, and the like. Ag-based or Al-based brazing filler materials have been conventionally and widely used for brazing such Ti alloys. Ag-based or Al-based brazing filler materials, however, have problems of resulting in low joint strength or insufficient corrosion resistance.

To these problems, Ti-based brazing filler materials have been developed. In particular, for the purpose of lowering the melting point, addition of Zr, Cu, Ni, and the like has been developed and put to practical use. These Ti-based brazing materials have a joint strength comparable to the base material as well as good corrosion resistance. For example, as disclosed in Japanese Patent Laid-Open Publication No. S59-220299 (Patent Literature 1), there was proposed an alloy in which Ni, Cu and Ag are added into Ti—Zr-based alloy. In addition, as disclosed in Japanese Patent Laid-Open Publication No. S59-126739 (Patent Literature 2), there was proposed an alloy in which various elements are added into an alloy comprising Ti, Zr, Hf and Cu.

The above-mentioned brazing filler materials comprising these alloys can be used for brazing Ti or Ti alloy or ceramics and the like, but are difficult to produce in ribbon form due to poor workability. It was therefore proposed that a brazing filler material be produced by liquid melt-spun ribbon production method, in which a molten alloy is ejected to the surface of cooling rolls which are rotating at a high speed.

On the other hand, some base materials to be brazed have complicated shapes and, in terms of latitude of the shape of the brazing filler material, it is also demanded, other than a ribbon, to produce a paste by mixing a powder and a binder. In this respect, melt-spun ribbons as disclosed in above-mentioned Patent Literatures 1 and 2 are difficult to meet this demand, and thus it is essential that a brazing filler material is powdered. Brazing filler materials in powder form are mainly categorized into two types as shown below.

One of the types is obtained by a mixing method, in which pure metal powders of individual elements, which constitutes an alloy to be a brazing filler material, are mixed in given proportions. The other type is obtained by producing an alloy to be a brazing filler material through atomizing method and the like, in which the brazing filler material consists of an alloy powder having a single composition. These two methods are applicable to conventional alloys such as Ni-based or Cu-based brazing filler materials, but are difficult to apply to Ti-based brazing filler materials as having a problem peculiar to Ti-base.

The problems peculiar to Ti-base are such that, in the mixing method, (1) an active metal powder such as Ti or Zr is oxidized; (2) it is difficult for alloying to proceed when jointing; and that, in atomizing method, (3) contamination occurs from the crucible when melting. For the problem of the above (1), for example, the section of background art of Patent Literature 2 describes that "active metal powder such as Ti and Zr tends to be easily oxidized to form an oxide on the surface of the powder, and this oxide remains in the joint part to become a factor for lowering credibility after jointing."

For the above problem (2), for example, paragraph [0003] of Japanese Patent Laid-Open Publication No. 2009-90304 (Patent Literature 3) describes that "The paste for jointing before heating is a mere mixture of active metal powder and a metal powder having a composition as the balance, and has problems that alloying before heating does not proceed sufficiently so that the strength tend to be insufficient." For the above problem (3), for example, the third paragraph in the introduction of "Denki Seikou" Vol. 74, No. 4, pages 227-232 (Non-Patent Literature 1) describes that "it is concerned that a reaction occurs between melting crucible and a molten titanium alloy to contaminate the titanium alloy powder from the material constituting the crucible.

[Citation List]
[Patent Literature]
[PTL 1] Japanese Patent Laid-Open Publication No. S59-220299
[PTL 2] Japanese Patent Laid-Open Publication No. S59-126739
[PTL 3] Japanese Patent. Laid-Open Publication No. 2009-90304
[PTL 4] Japanese Patent Laid-Open Publication No. H4-220198
[Non Patent Literature]
[NPL 1] "Denki Seikou" Vol. 74, No. 4, pages 227-232

SUMMARY OF THE INVENTION

However, none of the above patent literatures provides an example which alleviates the above problems (1) and (2). For the above problem (3), there is seen a method for melting by use of a special crucible as disclosed in paragraph [0021] of Patent Literature 3 or Table 3 of Non-Patent Literature 1, but improvement effect is not necessarily sufficient. There is also seen a method for melting by use of a high frequency coil and a water-cooled copper crucible as disclosed in Non-Patent Literature 1, but the equipment is peculiar. Further, Japanese Patent Laid-Open Publication No. H4-220198 (Patent Literature 4) proposes a single-composition alloy powder prepared by atomizing method, but it is unclear whether the above problem (3) has been solved.

The inventors has now found that a Ti-based brazing filler material in powder form to solve the above problems (1) to (3) at low cost is obtained by mixing a Zr-containing alloy powder comprising one or two of Cu and Ni and Ti powder or Ti-containing alloy powder (these powders are called herein as "Ti-based powder") in a given proportion. That is, the inventors has found that it is possible to provide a Ti-based brazing filler material in powder form, which can achieve good brazing and can exhibit excellent effects in the production of aerospace instruments, medical instruments, frames of glasses, heat-exchangers made from titanium.

Therefore, the object of the present invention is to provide a Ti-based brazing filler material in powder form, which can achieve good brazing and can exhibit excellent effects in the production of aerospace instruments, medical instruments, frames of glasses, heat-exchangers made from titanium.

According, to an aspect of the invention, there is provided a Ti-based brazing filler material comprising in mixture:

a Zr-containing alloy powder comprising 30 to 90% by mass of one or two of Cu and Ni, the balance being Zr and unavoidable impurities; and a Ti-based powder comprising 0 to 50% by mass of one or two of Cu and Ni, the balance being Ti and unavoidable impurities, wherein the Ti-based brazing filler material has a weight ratio of the Zr-containing alloy powder to the Ti-based powder of 8:2 to 4:6.

According to another aspect of the invention, there is provided a method for producing a Ti-based brazing filler material, the method comprising the steps of:

providing a Zr-containing alloy powder comprising 30 to 90% by mass of one or two of Cu and Ni, the balance being Zr and unavoidable impurities and a Ti-based powder comprising 0 to 50% by mass of one or two of Cu and Ni, the balance being Ti and unavoidable impurities; and mixing the Zr-containing alloy powder and the Ti-based powder to a weight ratio of the Zr-containing alloy powder to the Ti-based powder of 8:2 to 4:6.

DETAILED DESCRIPTION OF THE INVENTION

The present invention is explained in detail below. It is noted that "%" indicates herein "% by mass" unless otherwise defined.

The most important feature of the present invention resides in not simply mixing pure metal powders but mixing the Zr-containing alloy powder and the Ti-based powder. For example, when a Ti—Zr—Cu—Ni-based brazing filler material is produced by simply mixing pure metal powders, as in the above problem (1), these powders form a stiff oxide on the surface so that a reaction with the other metal powder in the surroundings be inhibited, as Ti and Zr are active metals. As a result, the brazing filler material is not molten well to leave a defect in the brazed part.

In addition, the melting points of each pure metal are as high as 1670° C. for Ti, 1855° C. for Zr, 1084° C. for Cu, and 1455° C. for Ni, and it is therefore necessary to lower the melting point by reacting with the other metal powders in the surroundings. Furthermore, an investigation of the oxygen level in the commercially available pure metal powders of Ti and Zr indicated that Ti powder contains 0.05 to 0.5 mass % of oxygen while Zr powder was not easily available and is carried with the liquid into which the powder is immersed due to possibility of explosion. When dried, its oxygen level in the Zr powder reached several %.

In view of the above, a device is needed especially for Zr powder, although it is an active metal as well. Thus, we decided not to use a Zr powder as a pure metal but to use a Zr-containing alloy in which the Zr level is lowered. This has made it possible to significantly prevent oxidization of the powder as well as to lower the melting point of Zr, which has the highest melting point among the constituting elements.

This is extremely effective to the problems (1) and (2). Moreover, it has also been found that a mixed powder of the Zr-containing alloy powder and the Ti-based powder provides unexpected effect as shown below. That is, there has been seen an effect that brazing the mixed powder of the Zr-containing alloy powder and the Ti-based powder leads to better reaction with the Ti powder being a mixing component, compared with the mixed powder using a Zr-free alloy powder and a Ti-based powder. The mechanism of this phenomenon is uncertain, but it is assumed that Zr, which has a higher affinity to oxygen than Ti, reduces the oxide on the surface of the Ti powder being an active metal, so that it can break the stiff oxide film on the surface of the Ti powder to facilitate the reaction with metal Ti. This is effective to the problem (2). Accordingly, it is the most important feature in the present invention to mix the Zr-containing alloy powder and the Ti-based powder.

On the other hand, in brazing filler materials in ribbon form, a brazing material formed by laminating ribbons of pure Ti, pure Cu and pure Ni, such as Ti—Cu—Ni laminated foil as described in paragraph [0004] of Patent Literature 3. In the case of laminated foils, however, it is considered that Ti can react with other elements even without containing an element having a function of reducing Ti-oxide, such as Zr, since the area where the respective pure metals contact with each other is large, unlike a mixed powder.

The second feature of the present invention is to limit the Cu and Ni content in the composition of the Zr-containing alloy powder. Cu and Ni both have an effect of significantly lowering the melt temperature by alloying with Zr having the highest melting point among the elements constituting the brazing material of the present invention. This is effective against the problem (2). Limiting the total amount makes it possible to achieve a low melt temperature while exhibiting an effect which is considered to be a reduction effect of the Ti-oxide by Zr. In addition, limiting the total amount of Cu and Ni leads to limitation of the Zr amount, and thus makes it possible to prevent contamination from the crucible upon production by atomizing method. This is very effective against the problem (3).

The third feature of the present invention is to limit the mixing ratio of the Zr-containing alloy powder to the Ti-based powder. When the mixing ratio of any one of the Zr-containing alloy powder to the Ti-based powder is too high, there may microscopically generate a region consisting of the powder with a higher mixing ratio even after mixing the powders. In this region, no reaction occurs between the powders with the both compositions, causing a defect in brazing or non-uniformity in composition after the brazing, and deteriorating the joint strength and the corrosion resistance. Therefore, limiting the mixing ratio of the both powders to a given proportion facilitate the alloying of the brazing part. This is very effective against the problem (2). The present invention has solved the conventional problems (1) to (3) effectively at low cost by combining the above features.

The Zr-containing alloy powder to be used in the present invention comprises 30 to 90%, preferably 40 to 80%, more preferably 50 to 75%, of one or two of Cu and Ni, the balance being Zr and unavoidable impurities. In the Zr-containing alloy powder, Cu and Ni have an effect of lowering the melt temperature of this powder and the brazing material as a whole and, when this powder is produced by atomizing method, also have an effect of lowering the oxygen level. The total amount of Cu and Ni of less than 30% reduces the effect of lowering the melt temperature of the brazing material as a whole and, when this powder is produced by atomizing method, also reduces the effect of reducing the oxygen level. On the other hand, the total amount of Cu and Ni exceeding 90% deteriorates reactivity with the Ti powder due to a reduced amount of Zr.

The Ti-based powder to be used in the present invention comprises 0 to 50% of one or two of Cu and Ni, the balance being Ti and unavoidable impurities. In other words, the Ti-based powder to be used in the present invention may be not only a Ti powder but also a Ti-containing alloy powder comprising one or two of Cu and Ni in an amount that exceeds 0% and is less than 50%. Containing more than 50% of one or two of Cu and Ni in the Ti-containing alloy powder may cause a melting failure when brazing or deteriorate uniformity. In consideration of the prices of the commercially available powders, it is preferred that the Ti-based powder does not contain Cu and Ni.

The Ti-based brazing material according to the present invention comprises the Zr-containing alloy powder and the Ti-based powder in mixture. That is, the Zr-containing alloy powder is an essential powder for facilitating the reaction with the Ti powder and attaining good brazing. It is necessary that these powders are mixed together.

The weight ratio of the Zr-containing alloy powder to the Ti-based powder in the Ti-based brazing material according to the present invention is 8:2 to 4:6, preferably 7:3 to 5:5, more preferably 6.5:3.5 to 5.5:4.5. When the weight ratio of the Zr-containing alloy powder to the Ti-based powder far exceeds the above range to get too close to any one of the powders, any one of the powders agglomerates in a microscopic region, where a brazing defect occurs.

EXAMPLES

The present invention is explained in detail below with reference to examples.

Example 1

A Zr-containing alloy powder having a composition as shown in Table 1 was prepared by pulverizing a melt-spun ribbon or gas-atomizing. After preparation of the powder, the powder was screened through a sieve having an opening size of 150 μm to prepare a powder having a size of 150 μm or less. Also, as a Ti powder and a Zr powder (comparative powder with regard to the Zr-containing alloy powder), commercially available Ti powder and Zr powder which have been screened to a size of 150 μm or less were also prepared. The oxygen level was measured on the Zr-containing alloy powder to obtain a result as shown in Table 1.

The Zr-containing alloy powder and the Ti powder were mixed in a mixing ratio as shown in Table 1 to prepare a mixed powder as a Ti-based brazing material. In order to evaluate the brazing properties on the mixed powder thus obtained, a lump of pure Ti with a size of 20 mm square was perforated to form an opening with a diameter of 10 mm. The opening was filled with the mixed powder and was heated in vacuum to 950° C. for brazing.

The cross-section of this specimen was observed and evaluated for existence/absence of a melting failure and uniformity of the brazing material in accordance with the following criteria:

<Existence/Absence of Melting Failure>
C: Melting failure over the entire surface
B: Melting failure in part
A: No melting failure
<Uniformity of Brazing Material>
C: Non-uniformity over the entire surface
B: Non-uniformity in part
A: Uniformity In addition, since the Zr-containing alloy powder was able to melt at a temperature of 1350° C. or lower when preparing a melt-spun ribbon or a powder, the melt temperature of the Zr-containing alloy powder has been significantly lowered from 1855° C. of that of pure Zr. "Melting failure" used herein refer to a condition where the powders are melted insufficiently to leave some powders, while "uniformity" used herein refers to a condition where a solidified layer has a composition uniformly mixed together after melting and solidifying the mixed powders. This means that a trace of the composition of the original powders (one of the mixed powders) being left locally is regarded as non-uniformity.

TABLE 1

| No. | Composition of Zr-containing alloy powder (mass %) | | | Production Method of Zr-containing alloy powder | Oxygen level in Zr-containing alloy powder (mass %) | Mixing ratio of Zr-containing alloy powder (wt. ratio) | Mixing ratio of Ti powder (wt. ratio) | Brazing properties of mixed powder | | Note |
|---|---|---|---|---|---|---|---|---|---|---|
| | Cu | Ni | Zr | | | | | Melting failure | Uniformity | |
| 1 | 30 | 0 | bal. | atomizing | 0.20 | 8 | 2 | B | B | Present |
| 2 | 60 | 0 | bal. | atomizing | 0.12 | 7 | 3 | A | A | Invention |
| 3 | 90 | 0 | bal. | atomizing | 0.02 | 5 | 5 | B | B | Examples |
| 4 | 0 | 30 | bal. | atomizing | 0.18 | 6 | 4 | A | B | |
| 5 | 0 | 60 | bal. | ribbon pulverization | 0.04 | 5 | 5 | A | A | |
| 6 | 0 | 90 | bal. | atomizing | 0.01 | 4 | 6 | B | B | |
| 7 | 20 | 15 | bal. | atomizing | 0.18 | 5 | 5 | B | B | |
| 8 | 20 | 30 | bal. | atomizing | 0.10 | 4 | 6 | A | B | |
| 9 | 20 | 60 | bal. | atomizing | 0.07 | 6 | 4 | A | A | |
| 10 | 10 | 30 | bal. | atomizing | 0.12 | 5 | 5 | A | B | |
| 11 | 30 | 30 | bal. | atomizing | 0.08 | 6 | 4 | A | A | |
| 12 | 40 | 30 | bal. | ribbon pulverization | 0.02 | 6 | 4 | A | A | |
| 13 | 20 | 0 | bal. | atomizing | 1.80 | 5 | 5 | B | C | Comp. |
| 14 | 0 | 20 | bal. | atomizing | 1.30 | 7 | 3 | C | C | Examples |
| 15 | 10 | 10 | bal. | ribbon pulverization | 0.10 | 6 | 4 | C | C | |
| 16 | 30 | 0 | bal. | atomizing | 0.20 | 9 | 1 | C | C | |
| 17 | 20 | 30 | bal. | atomizing | 0.10 | 3 | 7 | C | C | |
| 18 | 95 | 0 | bal. | atomizing | 0.01 | 5 | 5 | B | C | |
| 19 | 0 | 95 | bal. | atomizing | 0.01 | 4 | 6 | B | C | |
| 20 | 0 | 0 | bal. | commercially available powder | 3.10 | 5 | 5 | C | C | |
| 21 | 100 | 0 | bal. | atomizing | 0.01 | 5 | 5 | B | C | |
| 22 | 0 | 100 | bal. | atomizing | 0.01 | 5 | 5 | C | C | |
| 23 | 50 | 50 | bal. | atomizing | 0.01 | 5 | 5 | C | C | |

Note:
Underlined figures are outside the conditions as required in the present invention.

In Table 1, Nos. 1 to 12 are present invention examples, while Nos. 13 to 23 are comparative examples.

As shown in Table 1, in sample No. 13, the total content of Cu and Ni was less than 30% in view of 20% of Cu and no inclusion of Ni in the composition of the Zr-containing alloy powder, thus leading to a result that, for brazing properties of the mixed powder, a melting failure partially occurred and, for uniformity of the brazing material, non-uniformity over the entire surface was observed. In sample No. 14, the total of Cu and Ni was less than 30% in view of 0% of Cu and 20% of Ni as opposed to sample No. 13, thus leading to a result that, for brazing properties of the mixed powder, a melting failure occurred over the entire surface and, for uniformity of the brazing material, non-uniformity over the entire surface was also observed.

In sample No. 15, the total content of Cu and Ni was less than 30% in view of 10% of Cu and 10% of Ni in the composition of the Zr-containing alloy powder, thus leading to a result that, for brazing properties of the mixed powder, a melting failure occurred over the entire surface and, for uniformity of the brazing material, non-uniformity over the entire surface was also observed. In sample No. 16, the proportion of the Zr-containing alloy powder in the mixing ratio of the Zr-containing alloy powder to the Ti powder is high while that of the Ti powder is low, thus leading to a result that, for brazing properties of the mixed powder, a melting failure occurred over the entire surface and, for uniformity of the brazing material, non-uniformity over the entire surface was also observed.

In sample No. 17, the proportion of the Zr in the mixing ratio of the Zr-containing alloy powder to the Ti powder is low while that of Ti is high as opposed to sample No. 16, thus leading to a result that, for brazing properties of the mixed powder, a melting failure occurred over the entire surface and, for uniformity of the brazing material, non-uniformity over the entire surface was also observed. In sample No. 18, the content of Cu exceeds 90% in view of 95% of Cu and 0% of Ni in the composition of the Zr-containing alloy powder, thus leading to a result that, for brazing properties of the mixed powder, a melting failure partially occurred and, for uniformity of the brazing material, non-uniformity over the entire surface was also observed.

In sample No. 19, the content of Ni exceeds 95% in view of 0% of Cu and 95% of Ni in the composition of the Zr-containing alloy powder as opposed to sample No. 18, thus leading to a result that, for brazing properties of the mixed powder, a melting failure partially occurred and, for uniformity of the brazing material, non-uniformity over the entire surface was also observed. In sample No. 20, Cu and Ni are not contained in view of 0% of Ni and 0% of Cu in the composition of the Zr-containing alloy powder, thus leading to a result that, for brazing properties of the mixed powder, a melting failure occurred over the entire surface and, for uniformity of the brazing material, non-uniformity over the entire surface was also observed.

In sample No. 21, the content of Cu exceeds 95% in view of 100% of Cu and no inclusion of Ni, thus leading to a result that, for brazing properties of the mixed powder, a melting failure partially occurred and, for uniformity of the brazing material, non-uniformity over the entire surface was also observed. In sample No. 22, the content of Ni exceeds 95% in view of 0% of Cu and 100% of Ni as opposed to sample No. 21, thus leading to a result that, for brazing properties of the mixed powder, a melting failure occurred over the entire surface and, for uniformity of the brazing material, non-uniformity over the entire surface was also observed.

In sample No. 23, the content of both Cu and Ni exceeds 95% in view of 50% of Cu and 50% of Ni, thus leading to a result that, for brazing properties of the mixed powder, a melting failure occurred over the entire surface and, for uniformity of the brazing material, non-uniformity over the entire surface was also observed. In contract, it is understood that sample Nos. 1 to 12, which satisfy the conditions as required in the present invention, were excellent in both of brazing properties of the mixed powder and uniformity of the brazing material.

While Example 1 is an example directed to the mixed powder of the Zr-containing alloy powder and the Ti powder, a similar effect can be obtained even by using, instead of the Ti powder, a Ti-containing alloy powder comprising one or two of Cu and Ni in an amount that exceeds 0° h and is not more than 50° A), the balance being Ti and unavoidable impurities. An Example where such a Ti-containing alloy powder was used instead of the Ti powder is shown below.

Example 2

A Zr-containing alloy powder and a Ti-containing alloy powder as a Ti-based powder as shown in Table 2 were prepared and then subjected to evaluation of brazing properties. Preparation of the powders, classification and evaluation were conducted in the same manner as in Example 1.

TABLE 2

| | Zr-containing alloy powder (mass %) | | | | | | Ti-containing alloy powder (mass %) | | | | | | Brazing properties of mixed powder | | |
|---|---|---|---|---|---|---|---|---|---|---|---|---|---|---|---|---|
| No. | Cu | Ni | Zr | Production method | Oxygen level (mass %) | Mixing Ratio (wt. ratio) | Cu | Ni | Ti | Production method | Oxygen level (mass %) | Mixing Ratio (wt. ratio) | Melting failure | Evenness | Note |
| 24 | 60 | 0 | bal. | atomizing | 0.20 | 8 | 0 | 5 | bal. | atomizing | 0.09 | 2 | A | A | Present Invention Examples |
| 25 | 60 | 0 | bal. | atomizing | 0.20 | 7 | 10 | 0 | bal. | ribbon pulverization | 0.12 | 3 | A | A | |
| 26 | 0 | 30 | bal. | atomizing | 0.18 | 6 | 15 | 15 | bal. | atomizing | 0.05 | 4 | A | B | |
| 27 | 0 | 30 | bal. | atomizing | 0.18 | 4 | 30 | 20 | bal. | atomizing | 0.03 | 6 | A | B | |
| 28 | 0 | 90 | bal. | atomizing | 0.01 | 5 | 0 | 5 | bal. | atomizing | 0.09 | 5 | B | B | |
| 29 | 0 | 90 | bal. | atomizing | 0.01 | 6 | 30 | 30 | bal. | atomizing | 0.03 | 4 | B | C | Comp. Examples |
| 30 | 0 | 30 | bal. | atomizing | 0.18 | 9 | 15 | 15 | bal. | atomizing | 0.05 | 1 | C | C | |
| 31 | 20 | 30 | bal. | atomizing | 0.10 | 3 | 0 | 5 | bal. | atomizing | 0.09 | 7 | C | C | |

Note:
Underlined figures are outside the conditions as required in the present invention.

In Table 2, Nos. 24 to 28 are present invention examples, while Nos. 29 to 31 are comparative examples.

In sample No. 29, the content of Cu and Ni is high, thus leading to a result that, for brazing properties of the mixed powder, a melting failure partially occurred and, for uniformity of the brazing material, non-uniformity over the entire surface was also observed. In sample No. 30, the proportion of the Zr-containing alloy powder in the ratio of the Zr-containing alloy powder to the Ti-containing alloy powder is high while the proportion of the Ti-containing alloy powder is low, thus leading to a result that, for brazing properties of the mixed powder, a melting failure occurred over the entire surface and, for uniformity of the brazing material, non-uniformity over the entire surface was also observed.

In sample No. 31, the Zr proportion in the ratio of the Zr-containing alloy powder to the Ti-containing alloy powder is low while the Ti proportion is high as opposed to sample No. 30, thus leading to a result that, for brazing properties of the mixed powder, a melting failure occurred over the entire surface and, for uniformity of the brazing material, non-uniformity over the entire surface was also observed. In contract, it is understood that sample Nos. 24 to 28, which satisfy the conditions as required in the present invention, were excellent in both of brazing properties of the mixed powder and uniformity of the brazing material.

What is claimed is:

1. A Ti-based brazing filler material comprising in mixture:
   a Zr-containing alloy powder comprising a plurality of Zr-containing alloy particles that each comprise 30 to 90% by mass of one or two of Cu and Ni, the balance being Zr and unavoidable impurities; and
   a Ti-based powder comprising a plurality of Ti-based particles that each comprise 0 to 50% by mass of one or two of Cu and Ni, the balance being Ti and unavoidable impurities,
   wherein the Ti-based brazing filler material has a weight ratio of the Zr-containing alloy powder to the Ti-based powder of 8:2 to 4:6.

2. The Ti-based brazing filler material according to claim 1, wherein the Zr-containing alloy powder comprises 50 to 75% by mass of one or two of Cu and Ni.

3. The Ti-based brazing filler material according to claim 1, wherein the weight ratio of the Zr-containing alloy powder to the Ti-based powder is 6.5:3.5 to 5.5:4.5.

4. The Ti-based brazing filler material according to claim 1, consisting essentially of the Zr-containing alloy powder and the Ti-based powder.

5. The Ti-based brazing filler material according to claim 2, consisting essentially of the Zr-containing alloy powder and the Ti-based powder.

6. The Ti-based brazing filler material according to claim 3, consisting essentially of the Zr-containing alloy powder and the Ti-based powder.

7. The Ti-based brazing filler material according to claim 1, consisting of the Zr-containing alloy powder and the Ti-based powder.

8. The Ti-based brazing filler material according to claim 2, consisting of the Zr-containing alloy powder and the Ti-based powder.

9. The Ti-based brazing filler material according to claim 3, consisting of the Zr-containing alloy powder and the Ti-based powder.

10. The Ti-based brazing filler material according to claim 1, wherein the Ti-based powder is a Ti-containing alloy powder comprising a plurality of Ti-containing alloy particles that each comprise one or two of Cu and Ni in an amount that exceeds 0% and is up to 50%.

11. The Ti-based brazing filler material according to claim 1, wherein the Ti-based powder is a Ti-containing alloy powder comprising a plurality of Ti-containing alloy particles that each comprise 5 to 50% by mass of one or two of Cu and Ni.

* * * * *